United States Patent [19]
Rood

[11] 3,764,717
[45] Oct. 9, 1973

[54] METHOD FOR AUTOMATICALLY ORIENTING AND TRIMMING VEGETABLES

[75] Inventor: Walter E. Rood, Stevensville, Mich.

[73] Assignee: Michigan Fruit Canners, Inc., Benton Harbor, Mich.

[22] Filed: Aug. 3, 1971

[21] Appl. No.: 168,710

Related U.S. Application Data

[62] Division of Ser. No. 840,678, July 10, 1969, Pat. No. 3,621,900.

[52] U.S. Cl.............. 426/481, 99/635, 99/233.11, 83/409.1
[51] Int. Cl............................................. A23n 15/02
[58] Field of Search................... 146/83, 73, 224, 146/57, 17 R; 198/33 AA, 59, 60; 99/233.11, 233.7, 635; 83/409.1, 732

[56] References Cited
UNITED STATES PATENTS

| | | | |
|---|---|---|---|
| 2,858,866 | 11/1958 | Hendry | 99/635 |
| 3,092,160 | 6/1963 | Hartman et al. | 146/73 |
| 2,604,131 | 7/1952 | Ashlock, Jr. | 146/17 R |
| 3,270,788 | 9/1966 | Armstrong | 146/224 X |
| 3,153,473 | 10/1964 | Margaroli et al. | 198/33 AA |
| 3,180,477 | 4/1965 | Loveland | 198/33 AA |
| 3,515,193 | 6/1970 | Aguilae | 146/224 |
| 3,623,524 | 11/1971 | Buck | 146/83 |
| 3,439,720 | 4/1969 | Neufeld, Jr. | 146/57 |

FOREIGN PATENTS OR APPLICATIONS

| | | | |
|---|---|---|---|
| 1,043,730 | 9/1966 | Great Britain | 146/83 |

*Primary Examiner*—Andrew R. Juhasz
*Assistant Examiner*—Z. R. Bilinsky
*Attorney*—James P. Hume et al.

[57] ABSTRACT

A method for orienting and cutting vegetables places the vegetables onto a receptacle having a depression generally corresponding to the shape of the vegetables. The vegetables are vibrated on the receptacle so that they are horizontally disposed thereon. The receptacles with the vegetables are moved in a path that traverses cutting knives. The vegetables may be held as they traverse the cutting knives. Suitable vegetables for the process are onions.

9 Claims, 7 Drawing Figures

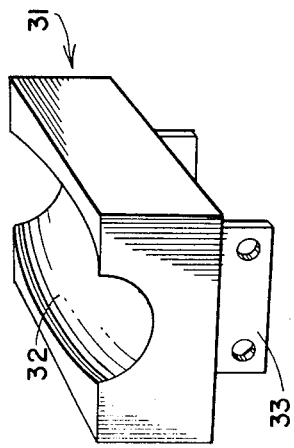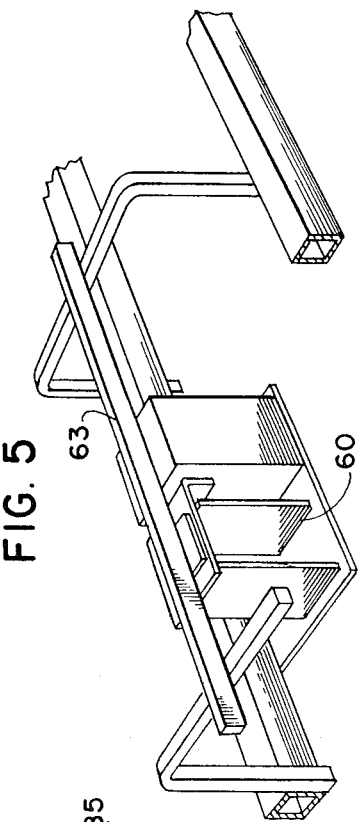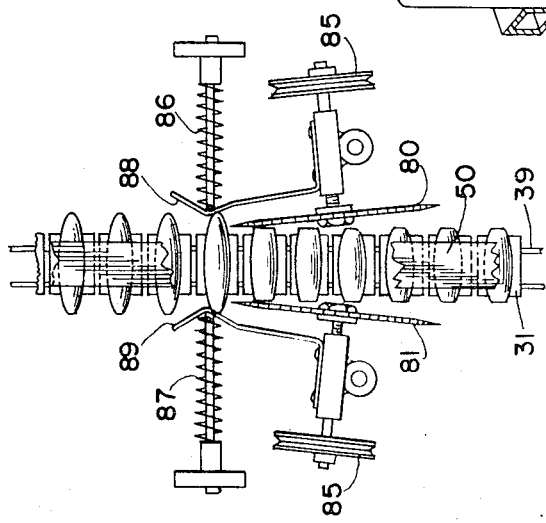

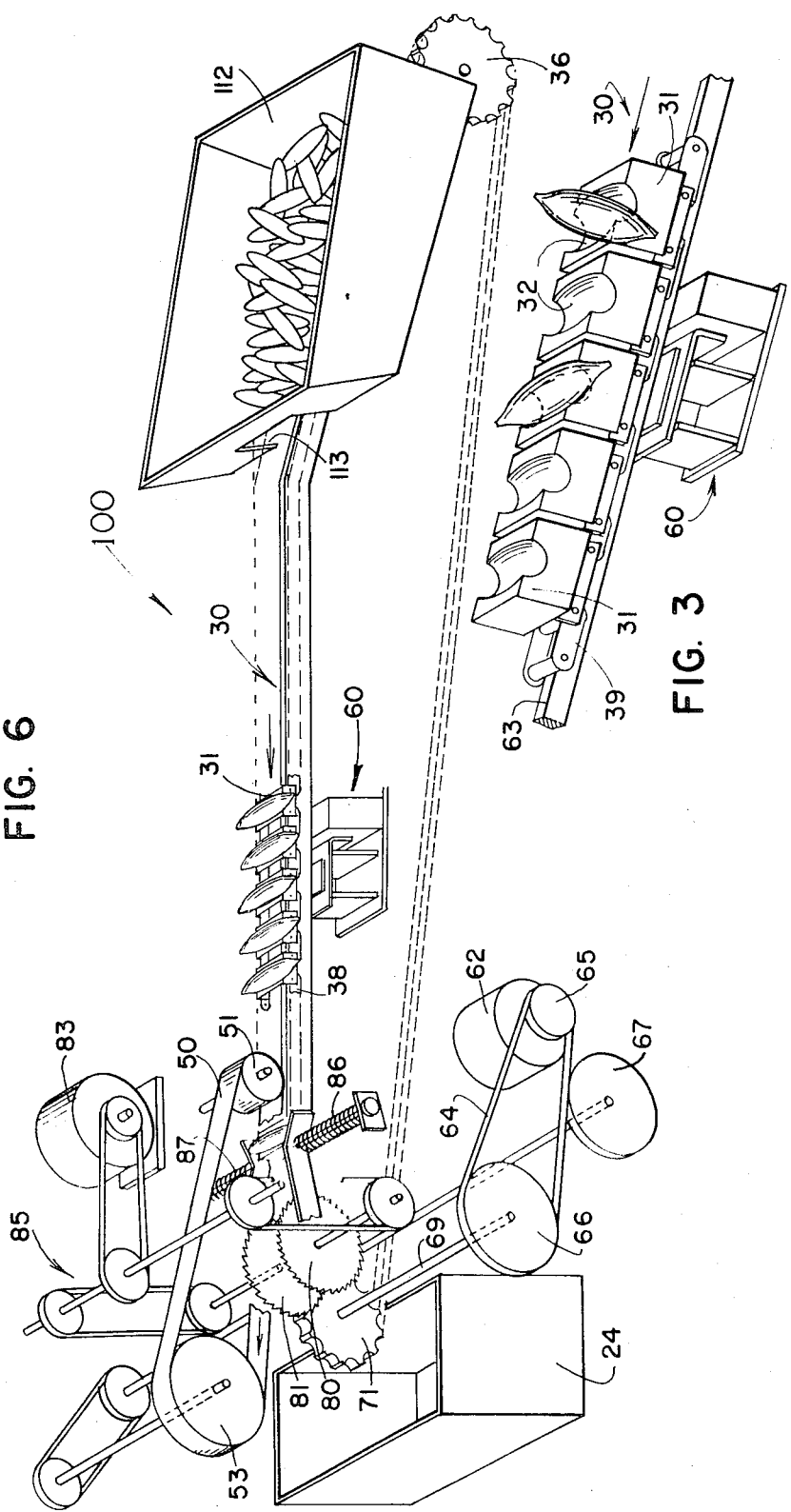

METHOD FOR AUTOMATICALLY ORIENTING AND TRIMMING VEGETABLES

This application is a division of application Serial No. 840,678, filed July 10, 1969, now U.S. Pat. No. 3,621,900.

FIELD OF THE INVENTION

The present invention relates to a method for automatically trimming vegetables to cut off the top portion and the root portions.

DESCRIPTION OF THE PRIOR ART

In the processing of fresh fruits and vegetables, it is necessary to remove the less desirable top portion or crown and the root portion. Heretofore, it has been the general practice to employ semi-automatic machines for accomplishing this result. One such machine is disclosed in U. S. Pat. No. 2,961,023, issued to Emmanuel F. Boyer. In this patent, a vegetable is placed by hand in a conveyor belt which then passes between two circular blades which trim the top and root portion of the vegetable. Because of the critical positioning of the blade, it is necessary to orient the vegetable by hand on the conveyor belt in order that the proper portions are trimmed. This is a slow procedure and is quite dangerous. Moreover, the amount of the vegetable that is removed depends on the skill of the operator and frequently too much or too little of the vegetable is removed.

The second type of machine utilized in the fruit and vegetable processing field is shown in U. S. Pat. No. 3,092,160, issued to Kenneth Hartman, and in U. S. Pat. No. 3,270,788, issued to Theodore Armstrong. In both of these patents, manual orientation of the fruit or vegetable has been eliminated by the use of a vibrating conveyor and the reliance of gravitational force to position the fruit or vegetable. However, both of these apparatuses are unsuccessful when used to trim the tops and bottoms of the vegetables or fruit since the machines disclosed in these patents can only be utilized to split the fruit or vegetable in half and cannot be modified to trim the ends of the fruit or vegetable.

A third type of trimmer is disclosed in U. S. Pat. No. 3,122,189, issued to Herbert Ebbe. This machine requires spikes located along a conveyor belt to hold the fruit or vegetable in place for cutting. Although such devices have served the purpose, they have not proved entirely satisfactory under all conditions of service.

SUMMARY OF THE INVENTION

The general purpose of this invention is to provide a completely automatic vegetable trimmer which embraces all of the advantages of similarly employed trimmers and possesses none of the aforedescribed disadvantages. To attain this, the present apparatus utilized a receptacle means for receiving and holding the vegetables, a means for automatically placing the vegetables onto the receptacle such that the vegetable is oriented horizontally so that each end of the vegetable extends beyond the side of the receptacle and a means for trimming the extended ends from the vegetable.

Therefore, an object of the invention is the provision of a method for orienting and trimming a fruit or vegetable.

Another object is to provide a method for orienting a fruit or vegetable which does not require human assistance.

A further object of the invention is the provision of a method for orienting fruits or vegetables automatically, and which can be applied to a wide range of sizes of fruit or vegetables.

Still another object is to provide a method which can orient and simultaneously trim the top and bottom of the fruit or vegetable simultaneously.

Yet another object of the present invention is the provision of a method for orienting and trimming the root ends and stems of an onion that is characterized by simplicity and reliability.

A still further object of the invention is to provide a method for trimming the root ends and stems from an onion more uniformly and more rapidly than has been possible in the past.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 2 is an enlarged view of the vegetable receptacle means used in the apparatus of FIG. 1.

FIG. 3 is a perspective view of the portion of the conveyor belt shown in FIG. 1.

FIG. 4 is a top view of the conveyor belt and knives utilized in the vegetable trimming machine of FIG. 1.

FIG. 5 is a perspective view partly in section showing the vibrator utilized in the embodiment shown in FIG. 1.

FIG. 6 is a perspective view of an alternative embodiment of the automatic vegetable trimming apparatus.

DESCRIPTION OF THE PREFERRED EMBODIMENT

Figure 1:
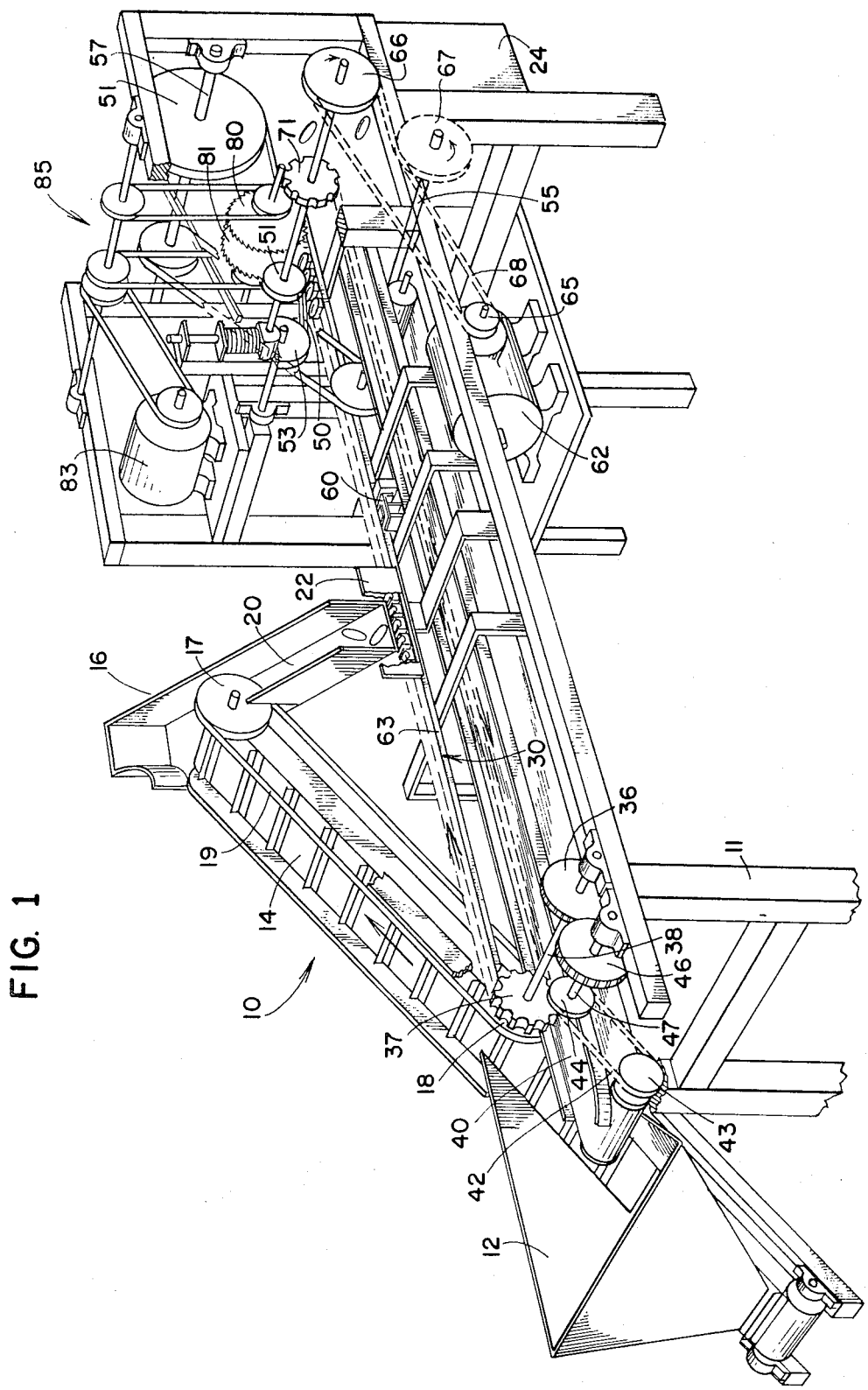
FIG. 1 is a perspective view of the vegetable orienting and trimming apparatus.

Referring now to the drawings, FIGS. 1 and 6 illustrate two different embodiments of an orienting and trimming machine for carrying out the steps of the method set forth below.

Broadly, the method comprises automatically loading the vegetables to be trimmed onto a carrier, vibrating the carrier so as to cause the vegetables to fall due to gravity, collecting the vegetables in a continuously moving receptacle, vibrating the receptacle so as to cause the vegetables to be horizontally disposed, such that each end of the vegetables extend beyond the receptacle, holding the vegetables firmly in the receptacle after the vegetables are horizontally disposed with extended ends, and trimming the horizontally extended ends.

This method of automatically orienting vegetables and fruits will be more clearly understood when taken in conjunction with two preferred embodiments for carrying out the method as shown in FIGS. 1 through 7.

Referring now to the drawings wherein like reference characters designate like or corresponding parts throughout the several views, there is shown in FIG. 1 an apparatus 10 for orienting and trimming vegetables automatically. The apparatus comprises a frame 11 having a movable conveyor means 30 mounted thereon. The conveyor means 30 automatically orients the vegetables in the proper fashion for trimming by circular knife blades 80 and 81. Vegetables are removed from feed hopper 12 by feed elevator 14. Feed elevator 14 may be any suitable type of conveying means such as a conventional conveyor belt. Elevator gear train 16 drives the feed elevator 14 in the direction of the arrow. As the vegetable reaches the top of the elevator 14 it drops into feeder vibrator 20. Feeder vibrator 20 is merely a conventional receptacle means having an open end and attached to the receptacle means in any conventional vibrator (not shown). The feeder vibrator 20 receives the vegetables and due to the vibrations, causes the vegetables to drop by force of gravity onto vegetable conveyor 30. An adjustable back stop or plate 22 is provided to prevent the vegetables from falling off the vegetable conveyor 30 during loading. It can thus be seen that vegetable elevator 14 provides a means for automatically loading the vegetable conveyor 30.

Referring also to FIGS. 2 and 3, momentarily, the construction of vegetable conveyor 30 is clearly shown. Vegetable conveyor 30 is motor driven, as will be later explained. The vegetable conveyor is comprised of a link chain 39 which rides along a rail 63 and sprockets 37 and 71. Vegetable conveyor 30 further comprises vegetable orienting pockets 31 placed upon link chain 39. The vegetable orienting pockets 31 are attached to a bracket 33 by any suitable fastening means. A depression 32 is located within vegetable orienting pocket 31. The shape of the depression is designed to correspond to the shape of the vegetable to be trimmed. Depending upon the vegetable, differently shaped depressions 32 are utilized. Brackets 33 are then connected to a link chain 39. The vegetable orienting pockets 31 are arranged on the chain in such a manner as to be slightly spaced apart from each other. In a preferred embodiment, the pockets 31 may be spaced ⅛ inch apart from each other, the length of each pocket may be 1⅞ inches and distance from the center of one pocket 31 to the center of the next pocket 31 on the chain may be 2 inches. In the embodiment shown in FIG. 1, a return conveyor 40 is provided. Any vegetables which slide off vegetable orienting pockets 31 land on return conveyor 40, and return to the feed hopper 12. The direction of movement of the return conveyor 40 is shown by the arrow in FIG. 1.

Vegetable conveyor 30 continually is in motion, and as the vegetables are placed within depressions 32 of vegetable orienting pockets 31, the vegetables proceed in the direction of the spaced rotating knives 80 and 81 as shown by the arrow. One or more vibrators are placed under rail 63 and link chain 39. These vibrators 60 are conventional vibrators and cause the vegetable to orient itself within the vegetable orienting pockets 31. Due to the shape of the pocket, conforming to the shape of the vegetable, the vegetable will always orient itself in such a manner as to have its ends hanging over the edge of vegetable orienting pockets 31. The placement of these vibrators 60 are more clearly shown in FIG. 5. Vibrator 60 causes rail 63 and chain 39 traveling along rail 63 to vibrate and thus vegetable orienting pockets 31 are caused to vibrate. It will be recognized by one skilled in the art that any conventional vibrator may be utilized, and any number of vibrators may be employed.

As vegetable conveyor 30 proceeds, the vegetable within the vegetable orienting pockets 31 soon move under a hold down belt 50. The hold down belt is driven by a conventional pulley arrangement comprising V-shaped pulleys 51 and 53. The purpose of the hold down belt 50 is to maintain the vegetable in its proper position for cutting, with the ends extending over both sides of the vegetable orienting pockets 31. The proper positioning of the vegetable at this point is clearly shown in the center vegetable orienting pocket of FIG. 3. The vegetable then proceeds between circular cutting blades 80 and 81, and the ends are trimmed. Referring now to FIG. 4, the cutting mechanism is more clearly shown. The vegetable placed in vegetable orienting pocket 31 proceeds under hold down belt 50. A spring biasing mechanism 86 is utilized to control knife blade skis 88 and 89 which adjusts each knife assembly 80 and 81 for various lengths of vegetables. Circular blades 80 and 81 are motor driven and trim both the root end and the top end of the vegetable. The trimmed vegetable then proceeds along the vegetable conveyor 30 and drops into a suitable receptacle means 24 shown in FIG. 1. It is obvious to one skilled in the art that this apparatus shown in FIG. 1 can operate continually and automatically so long as untrimmed vegetables are present in feed hopper 12. The above description generally outlines the functioning of the vegetable orienting and trimming apparatus 10.

In the preferred embodiment shown, only two motors are necessary. A first motor 62 is utilized to drive all conveyor belts and gear train means except for those for the cutting blades 80 and 81. Cutting blades 80 and 81 are driven by a motor 83. It would be obvious, that each conveyor may have a separate motor associated with it. However, in the preferred embodiment only two motors are required. The motor 62 drives a sprocket 65 which is connected to a conventional link chain 68 which turns a sprocket 66. Sprocket 66 is connected to a sprocket 71 which drives conveyor link chain 39. So long as motor 62 remains on, vegetable conveyor 30 will continually rotate in the direction shown by the arrow in FIG. 1. Link chain 68 turns sprocket 67 which is connected to pulley 55. Pulley 55 is connected by a belt 56 to pulley 57. Pulley 57 powers hold down belt 50 through a conventional pulley arrangement. The relative speeds of vegetable conveyor 30 and hold down pulley 50 may be regulated by changing the diameters of the associated sprockets, gears and pulleys described above.

As vegetable conveyor 30 rotates, a sprocket 37 is rotated. This sprocket 37 is connected to gear 36 and sprocket 18 by an axle 38. Gear 36 is an engagement with a gear 46 connected by axle 47 to a sprocket 44. As gear 36 rotates, gear 46 will rotate in an opposite direction. This rotation is transmitted to sprocket 44. Sprocket 44 is connected to a sprocket 43 by a conventional link chain 42. As sprocket 44 rotates, sprocket 43 will also rotate thereby causing return conveyor 40 to rotate in a direction opposite to that of vegetable conveyor 30. This will then cause any vegetables present on return conveyor 40 to drop into the feed hopper 12. The rotation of gear 36 also causes sprocket 18 to rotate. Sprocket 18 in turn is connected to a sprocket 17 by a link chain 19. Sprocket 17 causes feed elevator 14 to rotate and thereby to carry the vegetables from feed hopper 12 to feed vibrator 20 automatically. Motor 62 is controlled by a conventional control panel (not shown) which comprises an on-off motor switch directly associated with motor 62. It is recognized by one skilled in the art that the relative speeds for return conveyor 40 and feed elevator 14 are dependent upon the speed of motor 62 as well as the ratios of the associated sprockets and gears described above.

Circular cutting blades 80 and 81 are controlled by motor 83. Motor 83 is a high speed motor and is connected to the blade by a conventional pulley arrangement generally designated in FIG. 1 as numeral 85. Any conventional pulley system may be utilized to cause the cutting blades to rotate.

Feeder vibrator 20 in a preferred embodiment is a receptacle which may vibrate between zero and 3,600 vibrations per minute. Vibrator 60 is preferably a vibrator which can vibrate between zero and 7,200 vibrations per minute. The frequencies of these vibrators are adjusted by a conventional control means on the control panel (not shown). The frequency of vibration is determined experimentally based upon the weight of the vegetables to be trimmed.

The embodiment shown in FIGS. 1 through 5 has found great success in the onion field. Automatic vegetables orienting and trimming apparatus 10 is very easily adaptable to be utilized to trim an onion. Generally, there are two size grades of onions. A first grade which ranges in size between three quarters of an inch and ⅛ inches, and a second size which ranges between ⅛ inches and ⅝ inches. By designing two differently shaped pockets, both of these sizes may be accommodated. The pockets 31 are designed such that the vegetable becomes horizontally disposed when it is inserted in the pocket. For example, when short onions are being trimmed, the depression 32 in vegetable orienting pocket 31 is 1⅛ inches wide, 1 5/16 inches long, and around a 2 inch center. A suitable size for the blade 80 and 81, is 6 inches in diameter. However, any conventional blade may be utilized so long as it comes in contact with the vegetable passing along on the conveyor. When the larger grade of onion is being trimmed, the depression 32 will be slightly longer and cutting blades 80 and 81 will be set farther apart. Roller chain 39 may be a double pitch roller chain, having a 1 inch pitch. Utilizing this particular chain enables the vegetable orienting pockets to be spaced at the appropriate distances.

The chart below lists the dimensions of the component parts of vegetable orienting and trimming apparatus 10 when utilized as an onion trimmer. These dimensions are for illustration only and do not constitute a limitation to the inventive concept.

| | |
|---|---|
| MOTOR 62 | ⅛ H.P. -35 R.P.M. GEARHEAD |
| MOTOR 83 | 1720 R.P.M. |
| VIBRATOR 60 | 0 – 7200 V.P.M. |
| FEEDER VIBRATOR 20 | 0 – 3600 V.P.M. |
| SPROCKET 17 | NO. OF TEETH 20 |
| SPROCKET 18 | NO. OF TEETH 20 |
| SPROCKET 37 | NO. OF TEETH 35 |
| SPROCKET 43 | NO. OF TEETH 12 |
| SPROCKET 44 | NO. OF TEETH 30 |
| SPROCKET 65 | NO. OF TEETH 10 |
| SPROCKET 66 | NO. OF TEETH 30 |
| SPROCKET 67 | NO. OF TEETH 30 |
| SPROCKET 71 | NO. OF TEETH 30 |
| PULLEY 51 | 9 inch Diameter |
| PULLEY 53 | 3 ½ inch Diameter |
| PULLEY 55 | 2 ½ inch Diameter |
| PULLEY 57 | 4 ½ inch Diameter |

It has been found with the above embodiment, that 85 to 90 percent of all pockets along vegetable conveyor 30 are filled automatically. This high degree of reliability eliminates the necessity of utilizing an operator to hand load the conveyor belt. Furthermore, the vibrating means 60 underneath vegetable conveyor 30 causes the vegetable to be placed exactly in the center of vegetable orienting pocket 31, thereby enabling each vegetable to be trimmed exactly in the same manner as every other vegetable. Only a predetermined amount of root or top is removed from the vegetable by the blades. This amount is determined by the space set between knife blades 80 and 81 and the length of vegetable extending over the knife blade skis 88 and 89. The knife assemblies adjust individually for the length of onion protruding on either side of orienting cup 31 by the pushing out on skis 88 and 89 by springs 87 and 88 as shown in FIG. 4. The spaces between the skis and knife blades may be changed for each type of vegetable used. By utilizing a return conveyor 40, there is no waste involved in the process since all vegetables which do not proceed along the vegetable conveyor 30 are automatically returned to feed hopper 12. Consequently, by utilizing this apparatus, or a similar apparatus, an automatic means for trimming vegetables is available. In summation, the operation of vegetable orienting and trimming apparatus 10 is extremely simple in concept. The vegetables are dumped into feed hopper 12, feed elevator 14 feeds the onions automatically into vibrator feeder 20. The speed of feed elevator 14 is set to feed a few more vegetables than is actually necessary to keep all the vegetable orienting pockets 31 full. Adjustable back stop 22 helps position the vegetables in the vegetable orienting pockets 31. The vegetables that are surplus and fall off the vegetable orienting pockets 31 are returned to hopper 12 on the return conveyor 40. Vegetables proceeding in the vegetable orienting pockets 31 are oriented by the rail vibrator 60 and the shape of the pockets so as to be horizontally disposed with ends extending before reaching the hold down belt 50. Just before the vegetables reach the knives 81 and 82, they are held firmly in place for cutting by the hold down belt 50. Both ends of the vegetable are then cut off and they proceed to the end where they drop off into receptacle 24.

Figure 7:
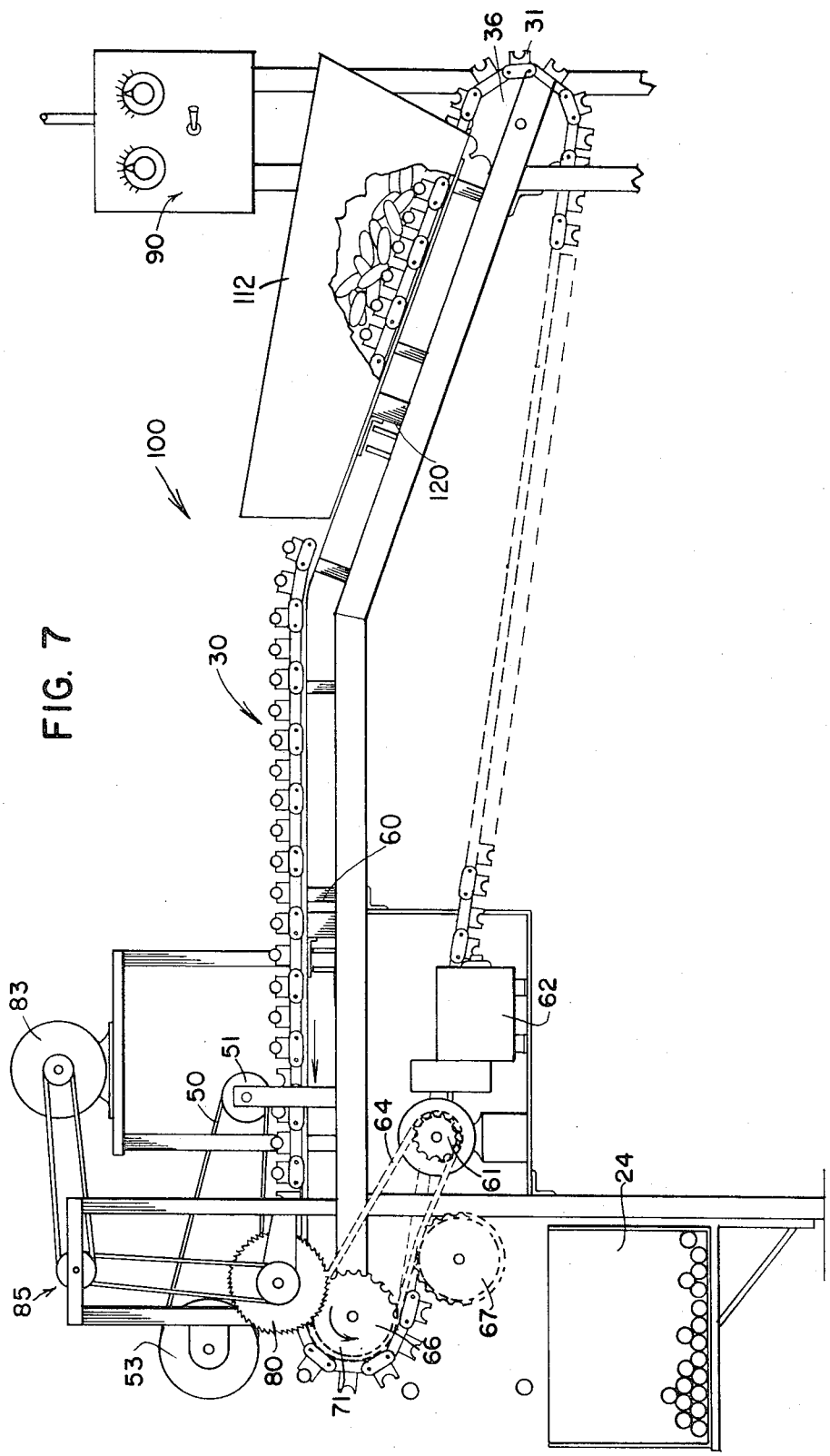
FIG. 7 is a side view of the apparatus shown in FIG. 6.

FIGS. 6 and 7 show an alternative embodiment for a vegetable orienting and trimming apparatus. The function of vegetable orienting and trimming apparatus 100 as shown in FIGS. 6 and 7 is very similar to that of the above described apparatus 10. Substantially, the only difference is that vegetable orienting and trimming apparatus 100 contains a V-shaped frame which passes through an aperture 113 in feed hopper 112. By utilizing this construction, no feed elevator is required. Vegetable conveyor 30 passes through feed hopper 112 and the vegetables are automatically placed in the vegetable orienting pockets 31. A vibrator 60 is utilized in conjunction with conveyor 30 to properly orient the onions as is described above in connection with vegetable orienting and trimming machine 10. Due to the fact that the onions are placed directly upon conveyor 30, it is not necessary to utilize a return conveyor as was utilized in the above described embodiment. Furthermore, the embodiment shown in FIG. 6 only requires one vibrator 60. Since hopper 112 feeds the vegetables onto conveyor 30, directly without the necessity of utilizing a vibrator, all other features of vegetable orienting and trimming apparatus 100 are identical to vegetable orienting and trimming apparatus 10, shown in FIGS. 1 through 5. It will be recognized by one skilled in the art, that the loading means in both embodiments are completely interchangeable.

It should be understood, of course, that the foregoing disclosure relates to only two preferred embodiments of the invention, and that numerous modifications or alterations may be made therein without departing from the spirit and scope of the invention as set forth in the appended claims.

I claim:

1. A method for orienting and trimming vegetables, the steps comprising:
    randomly placing vegetables into a plurality of receptacle means;
    said receptacle means having a depression for accommodating a vegetable;
    orienting said vegetable in each of said receptacle means wherein said vegetable is horizontally disposed such that each end of the vegetable extends beyond said receptacle means;
    said orienting step comprising vibrating said receptacle means so that the vegetable assumes the most stable position in the depression of said receptacle means.
    moving said receptacle means in a path traversing cutting means;
    trimming said extended ends from said vegetables and
    holding said vegetable in said receptacle means after said vegetable is oriented and during the trimming operation.

2. The method of claim 1 in which said vegetables comprise onions.

3. A method for orienting and trimming vegetables supported in receptacle means adapted for receiving and holding said vegetables, and in which said receptacle means is provided with a depression generally shaped to conform with the shape of said vegetables such that the most stable position for said vegetables is horizontal in orientation, the steps comprising:
    randomly placing said vegetables into said receptacle means;
    vibrating said vegetables in said receptacle wherein said vegetables are horizontally disposed and assume the most stable position in said depression;
    conveying said receptacle means containing said vegetables after said placing step;
    holding said vegetable while conveyed in said receptacle means after said vegetable is horizontally disposed; and
    cutting said vegetable while said vegetable is being held and conveyed in said receptacle means.

4. The method of claim 3 which further comprises vibrating said vegetables in said receptacle means during said placing step.

5. The method of claim 3 in which said vegetables comprise onions.

6. The method of claim 3 which further comprises the steps of collecting the vegetables that are not accommodated in said receptacle means and recycling them to said placing step.

7. A method for orienting and cutting vegetables, the steps comprising:
    randomly placing vegetables in a plurality of receptacle means, each of which said receptacle means has a depression for accommodating a vegetable;
    vibrating said vegetables in each of said receptacle means wherein the vegetables are oriented so that they assume the most stable position in said depression;
    moving said receptacle means in a path that traverses cutting means;
    cutting said vegetables while supported in said receptacle means; and
    holding the vegetables as they traverse said cutting means.

8. The method of claim 7 further comprising vibrating the vegetables in said receptacle means during said placing step.

9. The method of claim 7 which further comprises the steps of collecting the vegetables that are not accommodated in said receptacle means and recycling them to the placing step.

* * * * *